United States Patent
Simonetti et al.

(10) Patent No.: US 9,322,573 B2
(45) Date of Patent: Apr. 26, 2016

(54) SOLAR RECEIVER, PARTICULARLY OF THE TYPE FOR PARABOLIC LINEAR SOLAR CONCENTRATORS AND THE LIKE

(75) Inventors: Tancredi Simonetti, Thiene (IT); Piero Salinari, Florence (IT); Giovanni Ronda, Thiene (IT)

(73) Assignee: RONDA HIGH TECH SRL, Zane (IT)

( * ) Notice: Subject to any disclaimer, the term of this patent is extended or adjusted under 35 U.S.C. 154(b) by 533 days.

(21) Appl. No.: 13/638,369

(22) PCT Filed: Apr. 1, 2011

(86) PCT No.: PCT/IB2011/051413
§ 371 (c)(1),
(2), (4) Date: Sep. 28, 2012

(87) PCT Pub. No.: WO2011/121574
PCT Pub. Date: Oct. 6, 2011

(65) Prior Publication Data
US 2013/0014746 A1    Jan. 17, 2013

(30) Foreign Application Priority Data
Apr. 2, 2010 (IT) .............................. PD2010A0106

(51) Int. Cl.
*F24J 2/08* (2006.01)
*F24J 2/07* (2006.01)
(Continued)

(52) U.S. Cl.
CPC *F24J 2/07* (2013.01); *F24J 2/4636* (2013.01); *F24J 2/08* (2013.01); *F24J 2/14* (2013.01); *Y02E 10/41* (2013.01)

(58) Field of Classification Search
CPC ................... F24J 2/07; F24J 2/08; F24J 2/10; F24J 2/12; F24J 2/14; F24J 2/24; F24J 2002/003; F24J 2002/1004; F24J 2002/1023; F24J 2/4636; Y02E 10/45; Y02E 10/41
USPC .................................. 126/651, 683, 692, 694
IPC ....................... F24J 2/08, 2/10, 2/12, 2/14, 2/24
See application file for complete search history.

(56) References Cited

U.S. PATENT DOCUMENTS

| 1,696,003 A | * | 12/1928 | Harvey ...................... F24J 2/06 126/585 |
| 3,869,199 A | * | 3/1975 | Cummings ................... 126/651 |

(Continued)

FOREIGN PATENT DOCUMENTS

| CH | 679330 A5 * | 1/1992 | ................. F24J 2/07 |
| DE | 26 49 792 A1 | 5/1978 | |

(Continued)

OTHER PUBLICATIONS

Italian Search Report for Italian Application No. PD2010A000106 issued Dec. 1, 2010.

*Primary Examiner* — Gregory Huson
*Assistant Examiner* — Daniel E Namay
(74) *Attorney, Agent, or Firm* — Pearl Cohen Zedek Latzer Baratz LLP

(57) ABSTRACT

A solar receiver, particularly of the type for parabolic linear solar concentrators comprising a receiver tube, for the circulation of a heat transfer fluid, which is supported in a longitudinally adaptable manner in a shell that comprises a shielding body provided with a longitudinal slit, and at least one lens for closing the slit, which is permeable to the solar radiation that during use is reflected toward the receiver tube by a concentrator mirror, with which the shell is associated during use. Between the receiver tube and the shell an annular chamber is provided, which contains a preselected thermally insulating gas, at an operating pressure substantially comprised between 1 mbar and 31 mbar, the preselected gas having a thermal conductivity of substantially less than 0.01 W/mK at the operating temperature at the operating pressure.

9 Claims, 3 Drawing Sheets

(51) Int. Cl.
*F24J 2/46* (2006.01)
*F24J 2/10* (2006.01)
*F24J 2/12* (2006.01)
*F24J 2/24* (2006.01)
*F24J 2/14* (2006.01)

(56) References Cited

U.S. PATENT DOCUMENTS

| | | | | |
|---|---|---|---|---|
| 4,038,971 | A | * | 8/1977 | Bezborodko ............ F24J 2/145 126/606 |
| 4,136,671 | A | * | 1/1979 | Whiteford ............... F24J 2/145 126/654 |
| 4,137,899 | A | * | 2/1979 | Weslow ........................ 126/649 |
| 4,210,463 | A | * | 7/1980 | Escher .......................... 136/246 |
| 4,220,136 | A | | 9/1980 | Penney |
| 4,289,119 | A | * | 9/1981 | Meyer, Sr. ................. F24J 2/08 126/674 |
| 4,300,538 | A | * | 11/1981 | Uroshevich ................ F24J 2/07 126/646 |
| 4,328,792 | A | * | 5/1982 | Shores ...................... F24J 2/10 126/605 |
| 4,341,203 | A | * | 7/1982 | Bloxsom ...................... 126/651 |
| 4,341,204 | A | * | 7/1982 | Bloxsom ...................... 126/651 |
| 4,397,303 | A | * | 8/1983 | Stultz ......................... F24J 2/07 126/651 |
| 4,505,260 | A | | 3/1985 | Metzger |
| 4,505,263 | A | * | 3/1985 | Nameda et al. .............. 126/605 |
| 4,561,424 | A | * | 12/1985 | Gill ............................ F24J 2/07 126/649 |
| 4,680,090 | A | * | 7/1987 | Lew ........................ C02F 1/046 126/643 |
| 5,465,708 | A | | 11/1995 | Goebel |
| 6,244,264 | B1 | * | 6/2001 | Winston ................... F24J 2/055 126/570 |
| 6,407,328 | B2 | * | 6/2002 | Kleinwachter ............... 136/246 |
| 6,604,521 | B2 | * | 8/2003 | Smith et al. .................. 126/657 |
| 6,619,283 | B2 | * | 9/2003 | Ghela .......................... 126/692 |
| 7,870,855 | B2 | * | 1/2011 | Flaherty ....................... 126/651 |
| 8,857,426 | B2 | * | 10/2014 | Klier ...................... F24J 2/4625 126/572 |
| 2006/0168960 | A1 | | 8/2006 | Krouse |
| 2006/0207590 | A1 | * | 9/2006 | Levin ............................ 126/651 |
| 2009/0151713 | A1 | * | 6/2009 | Woodman ..................... 126/622 |
| 2010/0126499 | A1 | * | 5/2010 | Lu ................................ 126/651 |
| 2010/0236600 | A1 | * | 9/2010 | Kimura ....................... F24J 2/14 136/246 |
| 2010/0288352 | A1 | * | 11/2010 | Ji et al. ......................... 136/256 |
| 2010/0307553 | A1 | * | 12/2010 | Defries et al. ............... 136/243 |
| 2012/0138124 | A1 | * | 6/2012 | Shmueli et al. ............. 136/247 |
| 2012/0174911 | A1 | * | 7/2012 | Pedretti ....................... 126/651 |
| 2012/0291770 | A1 | * | 11/2012 | Klier ...................... F24J 2/4625 126/643 |

FOREIGN PATENT DOCUMENTS

| | | | | |
|---|---|---|---|---|
| DE | 4226268 A1 | * | 2/1994 | ............ F24J 2/055 |
| DE | 4430517 | | 3/1995 | |
| DE | 19718044 C1 | * | 9/1998 | ............ F24J 2/0015 |
| GB | 2063458 A | * | 6/1981 | ............... F24J 2/06 |
| JP | 59122851 A | * | 7/1984 | |
| JP | 59195059 A | * | 11/1984 | |
| JP | 60091157 A | * | 5/1985 | |
| SU | 992 946 A1 | | 1/1983 | |
| WO | WO 9010182 A1 | * | 9/1990 | ............... F24J 2/145 |
| WO | WO 2010004545 A1 | * | 1/2010 | ............... F24J 2/07 |

* cited by examiner

SOLAR RECEIVER, PARTICULARLY OF THE TYPE FOR PARABOLIC LINEAR SOLAR CONCENTRATORS AND THE LIKE

CROSS-REFERENCE TO RELATED APPLICATIONS

This application is a National Phase Application of PCT International Application No. PCT/IB2011/051413, International Filing Date Apr. 1, 2011, claiming priority of Italian Patent Application No. PD2010A000106, filed Apr. 2, 2010, which is hereby incorporated by reference.

TECHNICAL FIELD

The present invention relates to a solar receiver, particularly of the type for parabolic linear solar concentrators and the like.

BACKGROUND ART

Receivers for solar concentrators currently have a metallic tube into which the heat transfer fluid flows; the concentrator mirror reflects solar radiation, concentrating it on the tube, in which the fluid is heated in order to be used as a heat source for industrial processes or for the generation of electric power in a thermodynamic-cycle plant, optionally of the combined-cycle type for the combined generation of electric power and thermal power.

One strongly felt need in the field of solar concentration plants is to optimize the efficiency of the conversion of the absorbed solar energy into heat of the heat transfer fluid, in particular by minimizing heat losses.

Such losses have a radiative component, a conductive component and a convective component; the latter two are influenced by the characteristics of the environment surrounding the tube.

In order to contrast radiative dissipations, the tube is covered with a selective covering that is capable of allowing efficient absorption by the tube of radiation with a wavelength substantially comprised between 320 nm and 2000 nm while having a low emissivity of radiation with a wavelength of more than 2000 nm, which correspond to infrared radiation.

Furthermore, in order to contrast heat dissipation from the tube by conduction and convection, the tube is enclosed in a glass shell that defines, between itself and the tube, a gap in which vacuum is produced, i.e., in which there is air at a pressure substantially equal to $10^{-4}$ mbar.

Gas absorbers, also known as getters, adapted to eliminate the gases that have penetrated into the gap through the walls, are generally arranged in the gap.

Currently known receivers are composed of modules that comprise a portion of tube that is accommodated in a corresponding portion of glass shell, to which the tube is sealed at the ends by means of hermetic connectors which are provided with a deformable accordion-like portion for hermetic connection of the tube to the shell so as to not hinder their differential expansion, particularly in a longitudinal direction.

The modules are joined end to end at the connectors by welding, so that the portions of tube define a continuous duct for the heat transfer fluid.

The extension of the connectors is considerable with respect to the length of the module in order to allow adaptation to the considerable longitudinal differential expansion that the tube and the glass shell undergo during the operation of the concentrator.

Nowadays synthetic oil is generally used as a heat transfer fluid and has operating temperatures that are generally lower than, or equal to, 400° C.

In some recently developed plants, mixtures of molten nitrate salts are used instead at operating temperatures up to approximately 550° C.

As is known, the heat loss that occurs at the tube during the operation of the concentrator increases as the temperature of the tube rises.

In plants that comprise currently known receivers and use synthetic oil as a heat transfer fluid, the concentrator heats the oil to a temperature that is lower than approximately 400° C., achieving an average receiver efficiency of 79%.

In other plants currently being developed, which use molten salts as a heat transfer fluid, the fluid is brought, in currently known receivers, to an operating temperature of approximately 550° C., fully to the advantage of the efficiency of the user thermodynamic-cycle plant, yet making it possible to achieve a receiver efficiency of approximately 70%.

The efficiency losses that occur when using this second solution with respect to the first one are mainly due to the heat dissipations located at the receiver.

In particular, among the heat dissipation modes that underlie the efficiency reduction linked to the increase in the operating temperature of the heat transfer fluid, the radiation mode is predominant and is known to increase with the fourth power of the temperature of the heat transfer fluid.

DISCLOSURE OF THE INVENTION

The aim of the present invention is to provide a solar receiver, particularly of the type for parabolic linear solar concentrators and the like, that has a higher thermal efficiency than currently known receivers for equal operating conditions.

Within this aim, an object of the invention is to propose a solar receiver that makes it possible to achieve higher operating temperatures than those of currently known receivers for an equal efficiency.

Another object of the invention is to provide a solar receiver that has lower radiative heat dissipations than currently known receivers for equal operating conditions.

Another object of the invention is to propose a solar receiver that has, for equal operating conditions, lower heat dissipations due to thermal conduction and convection phenomena inside the receiver than currently known receivers.

Another object of the invention is to provide a solar receiver that makes it possible to maintain durably the thermal insulation efficiency of the heat transfer fluid that flows into it during use.

Another object of the invention is to propose a solar receiver that makes it possible to avoid failures of the articulated joints that connect the circulation tube of the heat transfer fluid and the delivery and discharge ducts and are adapted to allow the joint rotation of the mirror and of the tube that is joined integrally to it.

This aim and these and other objects that will become better apparent hereinafter are achieved by a solar receiver, particularly of the type for parabolic linear solar concentrators and the like, characterized in that it comprises a receiver tube, for the circulation of a heat transfer fluid, which is supported in a longitudinally adaptable manner in a shell that comprises a shielding body provided with a longitudinal slit, and
at least one lens for closing said slit, which is permeable to
the solar radiation that during use is reflected toward said receiver tube by a concentrator mirror, with which said shell is associated during use, between said receiver tube and said shell an annular chamber being provided, which contains a preselected thermally insulating gas, at an operating pressure substantially comprised between 1 mbar and 31 mbar, said preselected gas having a thermal conductivity of substantially less than 0.01 W/mK at the operating temperature at said operating pressure.

BRIEF DESCRIPTION OF THE DRAWINGS

Further characteristics and advantages of the invention will become better apparent from the description of a preferred but not exclusive embodiment of the solar receiver according to the invention, illustrated by way of nonlimiting example in the accompanying drawings, wherein.

WAYS OF CARRYING OUT THE INVENTION

Figure 1:
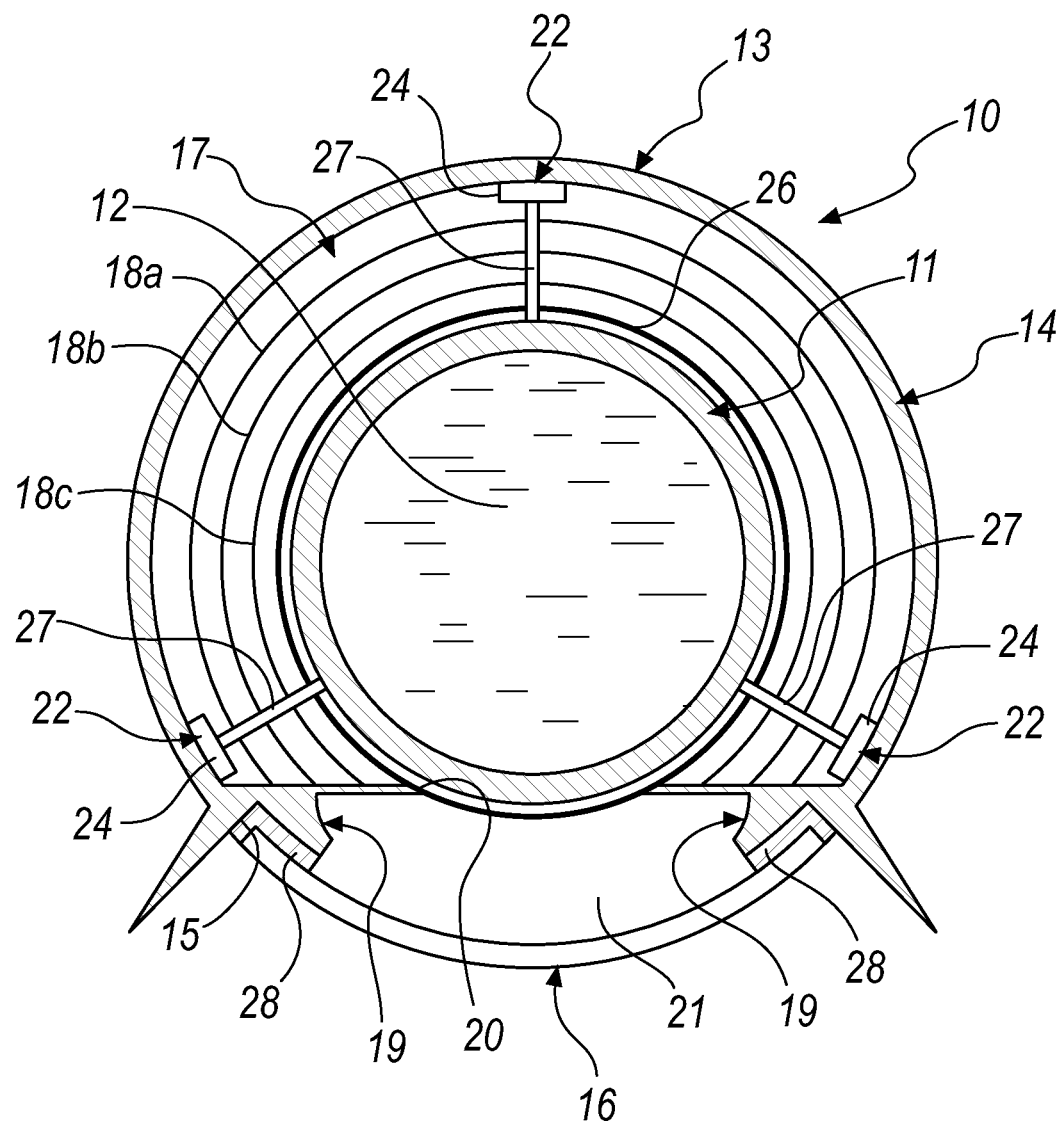
FIG. 1 is a transverse sectional view of a solar receiver according to the invention.

With reference to the figures, the numeral 10 generally designates a solar receiver, particularly of the type for parabolic linear solar concentrators and the like, which according to the invention comprises a receiver tube 11, for the circulation of a heat transfer fluid 12, which is supported in a longitudinally adaptable manner in a shell 13 that comprises a shielding body 14 provided with a longitudinal slit 15, and a lens 16 for closing the slit 15, which is permeable to the solar radiation that is reflected toward the receiver tube 11 by a concentrator mirror with which the shell 13 is associated during use.

Furthermore, according to the invention, an annular chamber 17 is provided between the receiver tube 11 and the shell 13 and contains a preselected thermally insulating gas at an operating pressure substantially comprised between 1 mbar and 31 mbar and preferably substantially equal to 10 mbar, the preselected gas having, at such operating pressure, a thermal conductivity of substantially less than 0.01 W/mK at the operating temperature.

Advantageously, the preselected gas is chosen between xenon and krypton; more particularly, between these preference is given to xenon.

Conveniently, the receiver 10 comprises three radiation shields 18a, 18b, 18c, which are interposed between the receiver tube 11 and the shielding body 14 of the shell 13.

Advantageously, the radiation shields 18a, 18b, 18c are made of a material that is capable of supporting itself at high temperatures and in particular are made for example of aluminum alloy in embodiments of the invention that have operating temperatures of the receiver tube 11 that are substantially lower than, or equal to, 550° C.

Alternatively, in embodiments of the invention that have operating temperatures of the receiver tube substantially higher than 550° C., the radiation shields 18a, 18b, 18c are made for example of steel, conveniently stainless steel, such as for example the steel classified as AISI 304.

Conveniently, the radiation shields 18a, 18b, 18c have an emissivity of no more than 7%.

Preferably, the radiation shields have a silver covering.

In a substantially equivalent manner, in alternative embodiments of the invention, according to the contingent requirements it is possible to provide more than one of said lenses and furthermore generally at least one of the radiation shields is provided, interposed between the receiver tube and the shielding body.

Advantageously, the receiver 10 also comprises reflecting shields 19, which are adapted to reflect toward the receiver tube 11 the radiation emitted thereby during use of the receiver 10.

Conveniently, the reflecting shields 19 are provided at the sides of the slit 15 inside the shell 13 and extend from it substantially to the receiver tube 11, defining a slot 20 toward it.

The reflecting shields 19 further define a channel 21 for direct radiation through the lens 16 toward the receiver tube 11.

The reflecting shields 19 preferably have a silver reflective coating.

Figure 2:
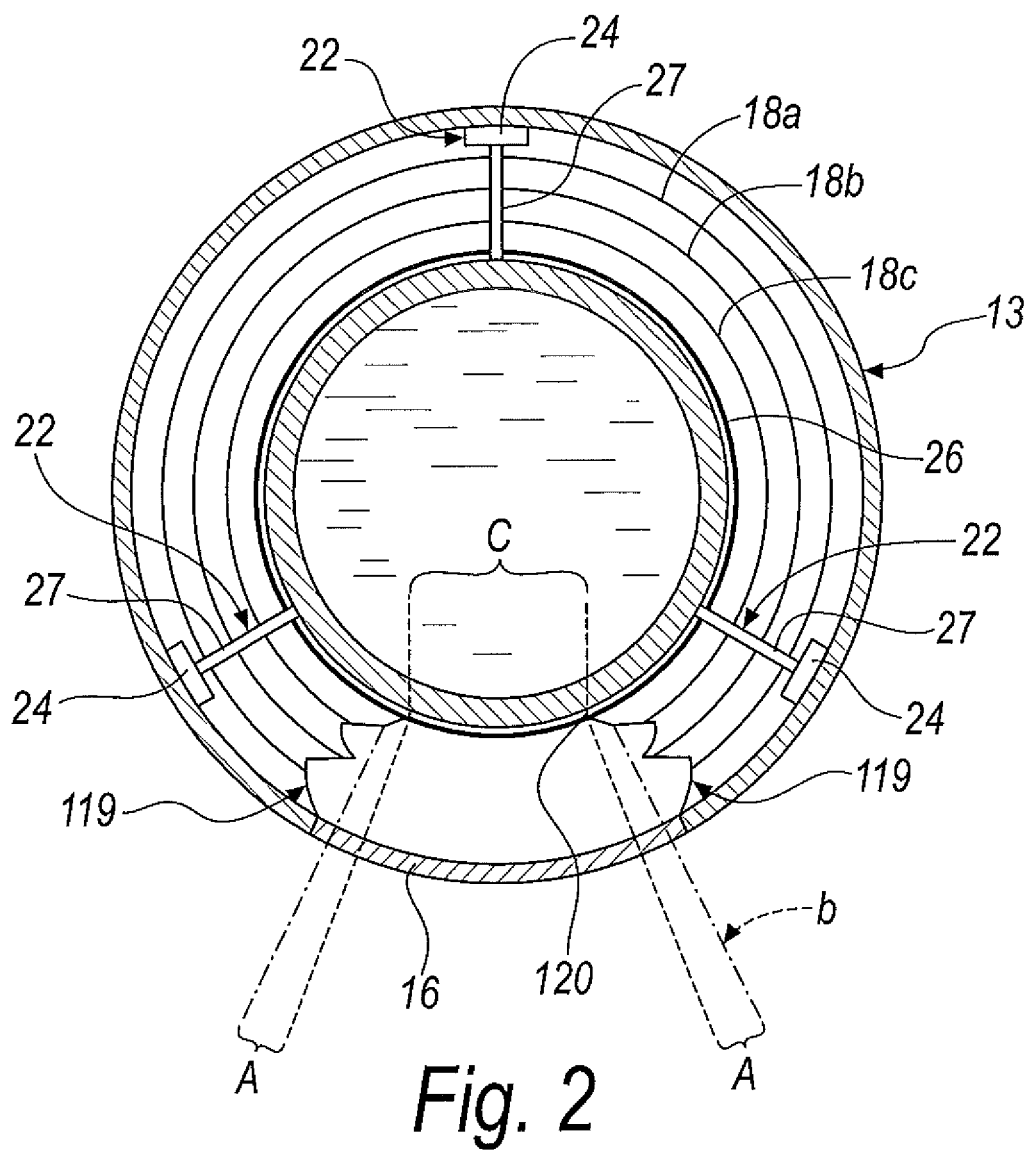
FIG. 2 is a schematic transverse sectional view of the solar receiver according to the invention in an alternative embodiment.
Figure 3:
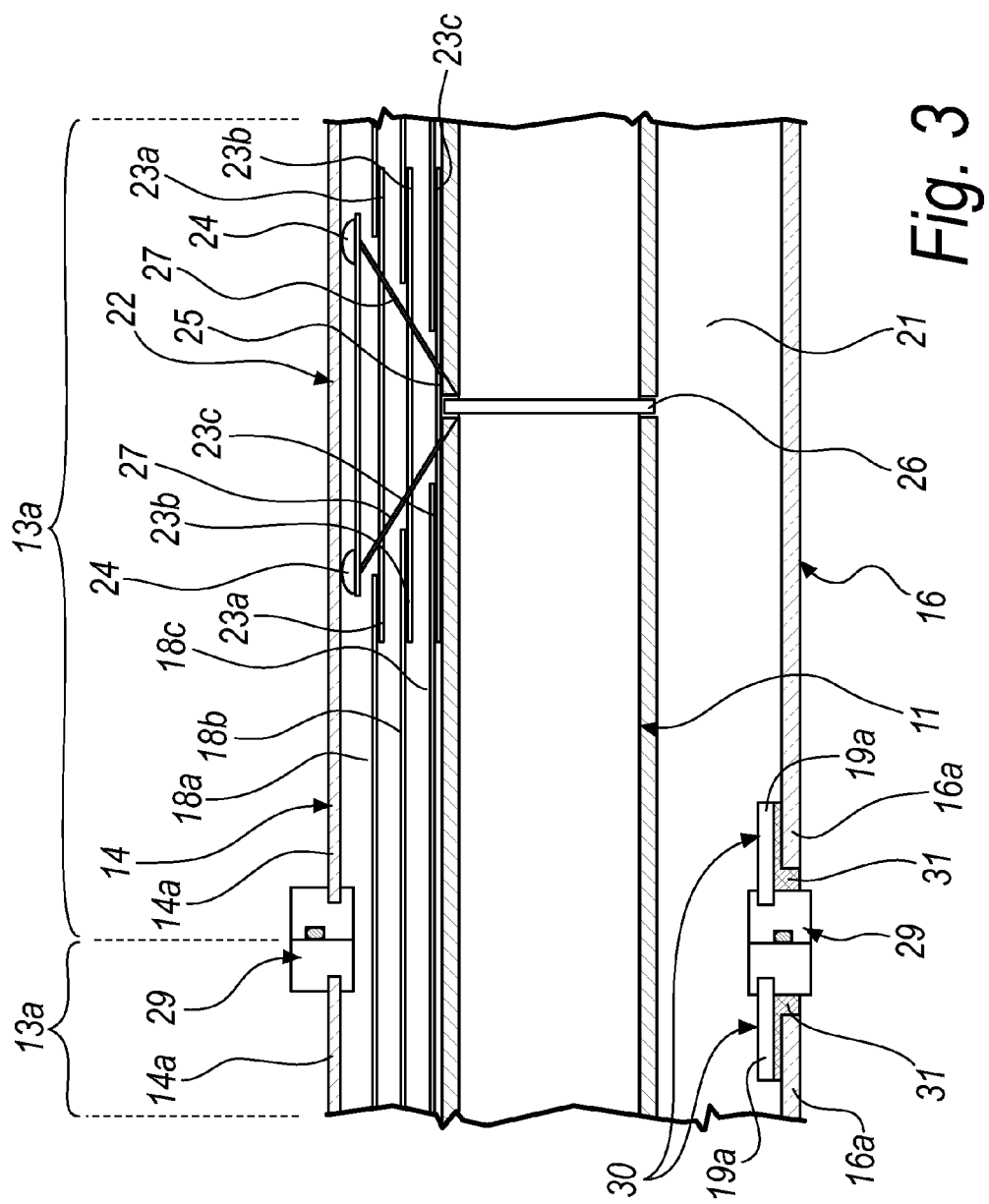
FIG. 3 is a schematic longitudinal sectional view of the solar receiver according to the invention.

In a solar receiver 10 according to the invention, provided in a particularly advantageous manner, the reflecting shields designated in FIG. 2 by the reference numeral 119 are conveniently extended so as to affect the end parts A of the light beam B directed toward the receiver tube 11 through the lens 16.

In particular, the reflecting shields 119 are shaped so as to reflect, by means of two or more reflections, onto the receiver tube 11 the extreme parts A of the light beam B that correspond to the peripheral portions of the image that is reflected, in a deformed manner, toward the solar receiver 10 by the concentrator that is associated therewith during use.

A marginal energy portion of the reflected radiation corresponds to the extreme parts A of the light beam B.

However, other structural aspects being equal, with respect to a structure that has reflecting shields shaped so as to allow the incidence of the extreme parts A on the receiver tube of a solar receiver according to the invention, the reflecting shields 119 make it possible to reduce the aperture of the slit, designated by the reference numeral 120 in FIG. 2, so as to reduce the portion C of the receiver tube 11 that is exposed directly to the shell 13, fully to the advantage of the radiative insulation of the solar receiver 10, which indeed at the portion C has the least radiative insulation in order to meet the need to achieve effective irradiation, with the concentrated solar radiation, of the receiver tube 11.

On the face of the lens 16, which is internal to the shell 13, advantageously a coating is provided, that is permeable to radiation that has a wavelength comprised substantially between 320 nm and 2000 nm, the coating being simultaneously adapted to reflect radiation with a wavelength substantially higher than 2000 nm, i.e., corresponding to infrared radiation.

The lens 16 thus reflects toward the receiver tube 11 the infrared radiation emitted by it during the operation of the system that comprises the solar receiver 10, thus acting as a radiation shield.

Conveniently, the receiver tube 11 has a selective coating, which allows an effective absorption by the receiver tube 11 of radiation with a wavelength substantially comprised between 320 nm and 2000 nm, at the same time allowing low emissivity of radiation with a wavelength above 2000 nm, which corresponds to infrared radiation.

Particularly if the receiver 10 according to the invention is used in the field of optics without image reconstruction, the lens 16 preferably has a shape that is adapted to correct the optical aberrations produced by the reflection of the concentrator mirror that during use reflects solar radiation toward the receiver tube 11.

Furthermore, the lens 16 conveniently has a shape that is adapted to reduce the focal length of the radiation beam that during use is reflected by the concentrator mirror toward the receiver tube 11, advantageously so as to concentrate onto the receiver tube 11 the beam of light that passes through it.

In alternative embodiments of the invention, depending on the contingent requirements, the lens is conveniently prismatic and has a shape that is adapted to concentrate on the receiver tube the radiation beam that is reflected by the concentrator mirror toward the receiver tube 11 during the operation of the receiver according to the invention.

The receiver 10 conveniently comprises sliding blocks 22 adapted to support the receiver tube 11 in the shell 13 so as to allow longitudinal sliding and axial rotation.

In this manner, the shell 13, which during use is conveniently jointly associated with the concentrator mirror, rotates with it about the receiver tube 11 during the movements adapted to track the position of the sun in order to concentrate its reflected light onto the solar receiver 10.

Conveniently, the sliding blocks 22 have three collars 23a, 23b, 23c that support the corresponding radiation shields 18a, 18b, 18c so as to allow mutual sliding longitudinally in order to avoid contrasting, during use of the receiver 10, the thermal expansion of the radiation shields 18a, 18b, 18c.

In particular, the sliding blocks 22 are provided with feet 24 for resting slidingly on the shielding body 14 which are advantageously made of, or equivalently covered with, polytetrafluoroethylene, PTFE in acronym, or a material that is likewise adapted to allow easy gliding at the operating temperatures of the receiver 10.

The sliding blocks 22 are further conveniently provided with a connector 25, which is adapted to mate with a connecting flange 26 which is provided advantageously on the receiver tube 11.

The connector 25 is preferably made of steel or, equivalently, of a material adapted to withstand the operating temperatures of the receiver 10, and a lubricant, for example graphite powder, is advantageously provided between the connector 25 and the connecting flange 26.

In addition, the sliding blocks 22 comprise slender frame rods 27 with poor heat conductivity, which connect the collars 23a, 23b, 23c, the feet 24 and the connector 26.

Advantageously, an elastic gasket 28 is also provided, which is interposed between the lens 16 and the shielding body 14 that supports it.

The elastic gasket 28 is conveniently such as to keep the shell 13 sealed and withstand the operating temperatures of the solar receiver 10, particularly also in case of an incorrect orientation of the light beam reflected by the concentrator mirror to which the solar receiver 10 is connected, that causes its concentration on the elastic gasket 28.

Advantageously, the shell 13 is made of modular elements 13a, which are joined consecutively by means of first hermetic joints 29, which connect consecutive portions 14a of the shielding body 14, and second hermetic joints 30, which connect consecutive modules 16a of the lens 16.

In particular, the second joints comprise connecting flanges 19a and interposition gaskets 31, which are provided between the connecting flanges 19a and the consecutive modules 16a of the lens 16.

In practice it has been found that the invention achieves the intended aim and objects, by providing a solar receiver, particularly of the type for parabolic linear solar concentrators and the like, that has a higher thermal efficiency than currently known receivers, for equal operating conditions, thanks to the presence of the radiation shields, of the reflecting shields and of the use of xenon gas at an operating pressure of substantially 10 mbar, such as to contrast effectively, therefore, the heat dissipation of the receiver tube both by conduction and by convection.

A solar receiver according to the invention thus allows to also achieve higher operating temperatures that those of currently known receivers, for an equal efficiency, thanks to the lower heat dissipation that it has for an equal operating temperature of the heat transfer fluid.

Another object of the invention is to provide a solar receiver that makes it possible to maintain in a durable manner the thermal insulation efficiency of the heat transfer fluid that flows into it during use.

The conductive and convective insulation of the receiver tube from the shell, provided by the use of the rarefied gas provided between them, is easy to maintain, since noble gases such as xenon and krypton can be purified easily with known chemical and physical methods, such as for example, in the case of the use of xenon, a liquid nitrogen cold trap that makes it possible to freeze the xenon and then extract from the volume of the receiver, with a simple vacuum pump, the impurities constituted by gases with a much higher vapor pressure that are present in the atmosphere, such as oxygen, nitrogen, helium, neon and hydrogen, which tend to contaminate it, thus compromising its thermal insulation characteristics.

The use of a solar receiver according to the invention also allows the optimization of the configuration of the parabolic mirror that is adapted to concentrate thereon the sunlight that it reflects.

In this way it is in fact possible to configure the mirror so that it provides a higher concentration of the beam that it reflects, concentrating it on the lens, which is part of the tube, differently from currently known receivers, on which the light beam is reflected with a lower concentration.

In particular, by using a receiver according to the invention, it is possible to configure simultaneously the concentrator mirror and the lens, so as to achieve a higher concentration of the light beam, in comparison to currently known concentrators.

Furthermore, a receiver according to the invention makes it possible to avoid the breakages of the articulated joints that in currently known receivers connect the circulation tube of the heat transfer fluid and the delivery and discharge ducts, since in a receiver according to the invention the tube can be fixed, as only the shell is integral with the mirror and rotating jointly therewith in the sun tracking motion.

The invention thus conceived is susceptible of numerous modifications and variations, all of which are within the scope of the appended claims; all the details may further be replaced with other technically equivalent elements.

In practice, the materials used, so long as they are compatible with the specific use, as well as the contingent shapes and dimensions, may be any according to the requirements and the state of the art.

The disclosures in Italian Patent Application No. PD2010A000106, from which this application claims priority, are incorporated herein by reference.

The invention claimed is:

1. A solar receiver, particularly of the type for parabolic linear solar concentrators and the like, comprising;
 a receiver tube configured to circulate a heat transfer fluid,
  said receiver tube being supported in a longitudinally adaptable manner in a shell, said shell comprising:
  a shielding body having a longitudinal slit, and at least one lens configured to close said slit, said lens being permeable to solar radiation reflected toward said receiver tube by a concentrator mirror, with which said shell is associated during use, an annular chamber located between said receiver tube and said shell, said annular chamber containing a preselected thermally insulating gas at an operating pressure substantially comprised between 1 mbar and 31 mbar, said preselected gas having a thermal conductivity of substantially less than 0.01 W/mK at the operating temperature at said operating pressure, wherein said annular chamber is not fluidly connected to said receiver tube, and at least one radiation shield interposed between said receiver tube and said shielding body of said shell, wherein said preselected thermally insulating gas is xenon or krypton.

2. The solar receiver according to claim 1, further comprising reflecting shields configured to reflect toward said receiver tube the radiation emitted thereby during use, said reflecting shields being provided at the sides of said slit inside said shell and extending from said shell substantially to said receiver tube, thereby defining a slot toward said receiver tube, said reflecting shields further defining a channel for direct radiation through said at least one lens toward said receiver tube.

3. The solar receiver according to claim 2, wherein said reflecting shields have a silver reflective coating.

4. The solar receiver according to claim 1, wherein a coating is provided on a face of said at least one lens, which is internal to said shell wherein said coating is permeable to radiation having a wavelength substantially comprised between 320 nm and 2000 nm, said coating simultaneously reflecting radiation having a wavelength substantially higher than 2000 nm.

5. The solar receiver according to claim 4, wherein said at least one lens has a shape that is adapted to correct the optical aberrations produced by the reflection of the concentrator minor that during use reflects solar radiation toward said receiver tube.

6. The solar receiver according to claim 4, wherein said at least one lens has a shape that is adapted to reduce the focal length of the radiation beam that during use is reflected by the concentrator mirror toward said receiver tube.

7. The solar receiver according to claim 4, wherein said at least one lens is prismatic and has a shape that is adapted to concentrate on said receiver tube the radiation beam that during use is reflected by the concentrator mirror toward said receiver tube.

8. The solar receiver according to claim 1, further comprising sliding blocks configured to support said receiver tube in said shell so as to allow longitudinal sliding and axial rotation.

9. The solar receiver according to claim 8, wherein said sliding blocks have at least one collar configured to support said at least one radiation shield, said at least one radiation shield being supported by said at least one collar so as to allow mutual sliding longitudinally to said at least one radiation shield.

* * * * *